United States Patent [19]

Weinblatt

[11] Patent Number: 4,670,738

[45] Date of Patent: Jun. 2, 1987

[54] COMPUTER INPUT TECHNIQUE

[76] Inventor: Lee S. Weinblatt, 797 Winthrop Rd., Teaneck, N.J. 07666

[21] Appl. No.: 694,849

[22] Filed: Jan. 25, 1985

[51] Int. Cl.⁴ .............................................. G06F 3/02
[52] U.S. Cl. ................................ 340/365 P; 340/712; 250/221
[58] Field of Search ................... 340/365 P, 711, 712, 340/706, 710, 709, 720, 365 E, 365 S; 400/475; 273/148 B, 138 A; 178/18; 250/221; 84/490 R; 235/492, 468

[56] References Cited

U.S. PATENT DOCUMENTS 4,301,447 11/1981 Funk et al. ...................... 340/365 P

FOREIGN PATENT DOCUMENTS

| 0091689 | 7/1980 | Japan | 400/475 |
| 0140831 | 8/1983 | Japan | 340/706 |
| 0137032 | 8/1983 | Japan | 340/706 |
| 0132830 | 8/1983 | Japan | 340/706 |
| 0140832 | 8/1983 | Japan | 340/706 |
| 0137031 | 8/1983 | Japan | 340/706 |

Primary Examiner—John W. Caldwell, Sr.
Assistant Examiner—Mahmoud Fatahi-Yar
Attorney, Agent, or Firm—Thomas Langer

[57] ABSTRACT

A technique is provided for entering certain information into a computer without the use of hands. A touch screen system which utilizes a grid of light beams across a display surface is modified. Instead of interrupting the light beam with the operator's finger, light blocking devices are moved into position along the periphery of the surface to shield a light detector at the position where otherwise such detector would be blocked by the operator's finger. The light-blocking device is moved by motors under foot control. In another approach, indicator arrays are placed along adjacent sides of a display surface. One indicator along each side is lit by foot control to represent a selected position. In still another approach, a cursor is selectively positioned on the display surface with foot-operated control circuitry. Once a position is selected, further inputs can be made even with the use of another, hand-operated, technique in a convenient, user friendly and prompt manner.

2 Claims, 3 Drawing Figures

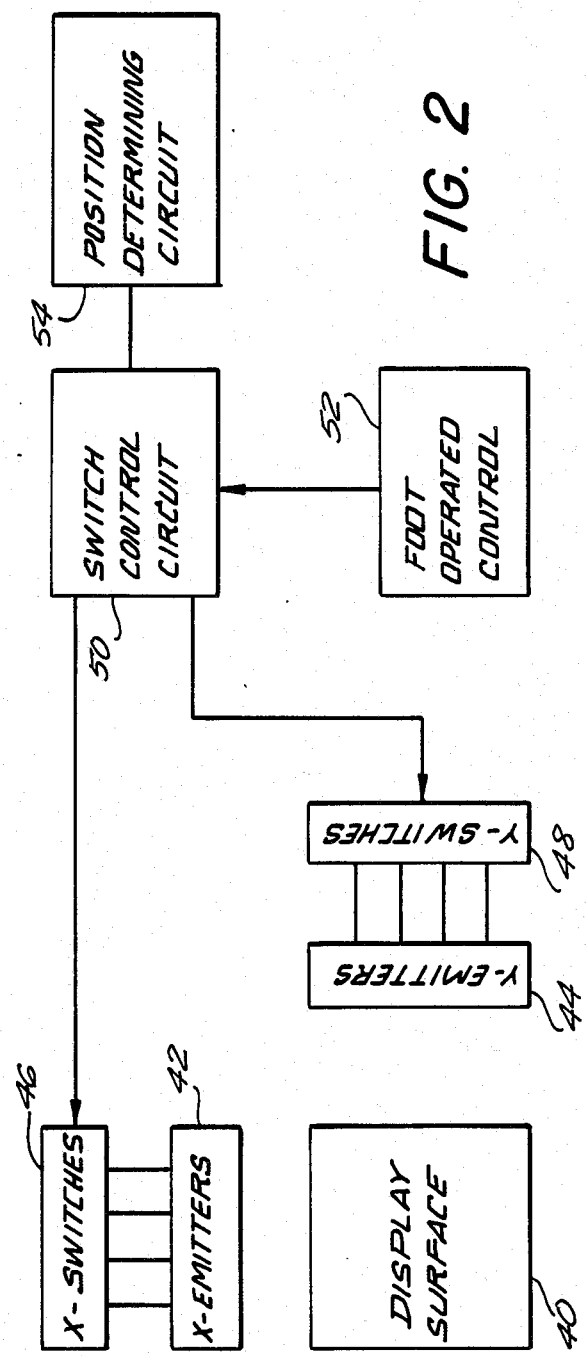
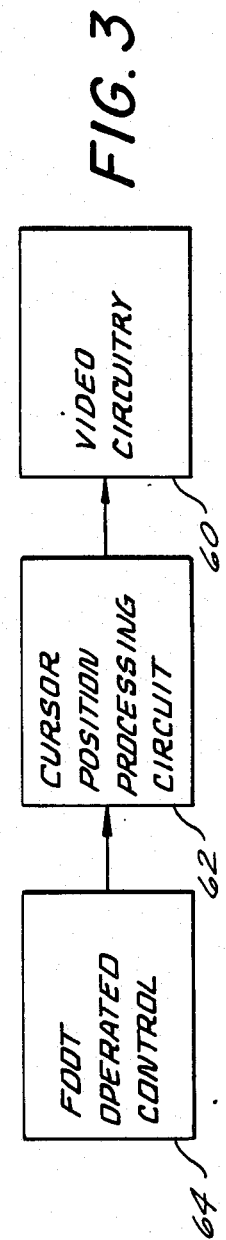
FIG. 2
FIG. 3

COMPUTER INPUT TECHNIQUE

BACKGROUND OF THE INVENTION

This invention is directed to a technique for entering instructions, data and other information into a computer and, more particularly, to a user friendly computer input technique which does not require the use of hands and thus can be readily combined with another input technique, such as a keyboard, which does rely on hand usage.

The first and still most commonly used computer input device is the keyboard. When computers came into general use, typewriter keyboards were already familiar and the adoption of the friendly keyboard for this new purpose eased the transition into the world of computing. However, the keyboard has several limitations. Firstly, a familiarity and ability with it are required. As the use of computers has become more widespread, many users do not fit into this category. Secondly, handling certain tasks with a keyboard is much slower than with alternative input devices. Thirdly, multiple keyboard symbols representing certain instructions, for example, must be memorized since a large number of tasks must be performed by a limited number of keys thereby complicating the input operation and introducing a source of error. For these as well as other reasons, light pens, bar code scanners, sketch pads, touch screens, the mouse, and a host of other alternate inputs have been developed which are not only more user friendly than a keyboard, but also enable the user to perform feats previously not possible with a keyboard.

One of the easiest and most user friendly of these input devices is the touch screen. It permits the user to simply select from among a number of alternate commands, for example, which are displayed on the screen. All the user needs to do is simply touch the screen where the desired command appears. A position detector senses the location of the finger, inputs it to the computer which then compares it with the position of each diplayed command to determine which was selected. U.S. patents which disclose various approaches for implementing the touch screen include U.S. Pat. Nos. 3,764,813 to Clement et al, 4,247,767 to O'Brien et al, 4,267,443 to Carroll et al, and 4,301,447 to Funk et al.

Another user friendly input device is the mouse. It can be rolled on any surface to position a cursor on the screen. Buttons on the mouse can be used when the cursor is properly positioned to activate a desired function. One such technique is disclosed in U.S. Pat. No. 3,541,541 to Engelbari.

Both the touch screen and the mouse, as user friendly as they are, nevertheless cannot be considered replacements of the keyboard. The keyboard remains an essential component of any computer input system. Alternate input devices have certain advantages, but none can perform all the functions of the keyboard as well. Taking this as a given, it can readily be appreciated that many tasks require the cooperation of a keyboard and an alternate input device. For example, in word processing the cursor needs to be positioned precisely at the location where, say, an insertion is to be made; or in a spreadsheet the desired cell must be located so the necessary changes can be made. To locate the desired postion with a keyboard is time consuming. A touch screen or mouse can do it practically instantaneously. However, the operator must remove his hand from the keyboard, operate the alternate input, and then return to the keyboard to make the text changes. Removal of the hand from and return to the keyboard can be awkward and time consuming, particularly for a non-typist which, as mentioned above, is a category into which more and more computer users fit. Thus, the need exists for a user friendly input device which can be operated without requiring the operator to remove his hand from the keyboard.

SUMMARY OF THE DRAWINGS

A general object of the invention is to provide a computer input technique.

Another object of the invention is to provide a user friendly computer input device.

Figure 1:
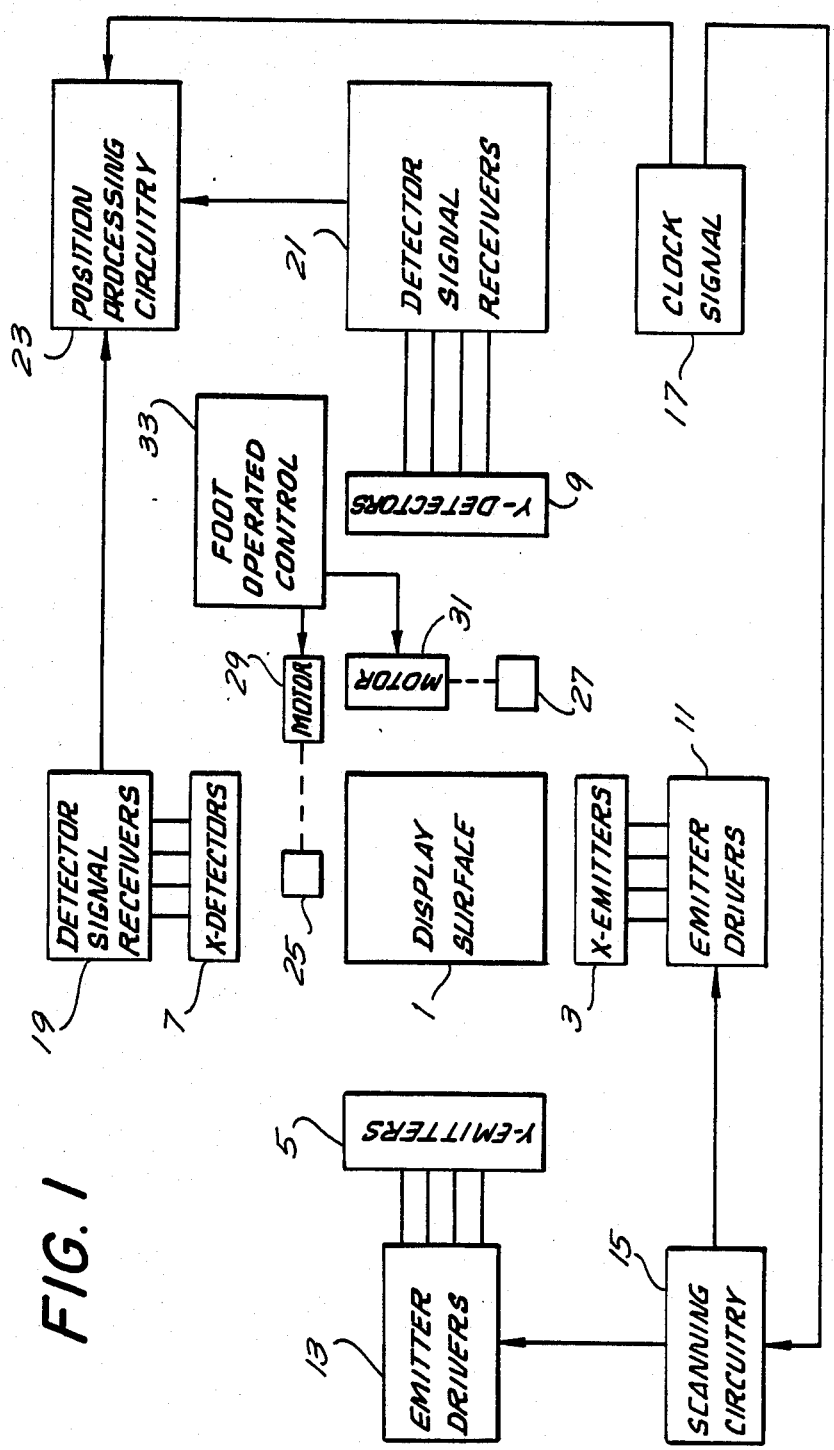

A more specific object of the invention is to provide a computer input device which does not require the use of an operator's hands.

A further object of the invention is to provide a computer input device which is convenient, fast, and easy to learn.

These and other objects of the invention are attained by the use of a computer input technique which is controlled with the foot. In one embodiment, a standard touch screen system is used. Such a system includes an array of light emitters on one side of the display surface and a corresponding array of light detectors on the opposite side. These provide information for, say, the X direction. The same arrangement of emitters and detectors is used along the other two sides to obtain Y direction information. An object placed on the display surface will be sensed because it interrupts one X and one Y light beam and will correspondingly be identified as located at that X, Y position. According to the invention, the standard touch screen system is modified by placing a shield that is moveable along a line between the light emitter array and its corresponding detector array. Movement of the shield position is foot controlled. One shield is used for the X direction and another for the Y direction and together, when properly positioned, they simulate an object placed on the screen in that one X detector and one Y detector are blocked, just as would be the case had the operator's finger been placed on the display surface. This approach facilitates the retrofit of existing systems.

In another embodiment, only two arrays are required. Both include light emitters used as indicators. The arrays are placed along adjacent sides of the display surface. Foot-controlled circuitry is used to light one X indicator and one Y indicator which together represent the selected X, Y position.

A further embodiment utilizes a cursor displayed on the display surface. The invention provides foot operated controls to position the cursor at the selected position.

BRIEF DESCRIPTION OF THE DRAWINGS

The invention is directed to a computer input technique using foot operated controls to leave the operator's hands free for other tasks such as manipulating a keyboard, as disclosed below with reference to the following drawings:

FIG. 1 is a block diagram of one embodiment of the invention as applied to a touch screen arrangement;

FIG. 2 is a block diagram of an other embodiment of the invention as applied to a touch screen arrangement.

FIG. 3 is a block diagram of yet another embodiment of the invention as applied to a cursor positioning arrangement.

DETAILED DESCRIPTION OF THE DRAWINGS

One type of input device to a computer which is an alternate to the keyboard has become known as the touch screen. Inputs to the computer are made by simply touching the screen of a video monitor at the point where, for example, a desired command is displayed. The touch screen includes means to sense the position of the pointer which is normally the operator's finger. This position information is transmitted to the computer which compares it to the position of each of the various displayed commands to determine the one selected. The position detection is done by means located just above the screen. Such means may be part of the monitor or may be included in a frame which is secured to the monitor. Any such mounting of the detection means is referred to below as being part of a frame on the video monitor.

Turning now of FIG. 1, one embodiment of the invention is shown with reference to display surface 1. Although typically such a surface will be the screen of a video monitor, it can also be a projection screen. All such surfaces upon which an image can be displayed will be referred to below as simply display surfaces. Display surface 1 is shown as a square but obviously it can be rectangular as well. Rather than showing an actual display surface with a frame around it incorporating the position detector means, FIG. 1 depicts these in relative locations which are a representation of their actual positions. An array of X-emitters 3 is positioned along one side of display surface 1. It includes a plurality of light sources (not shown). The number of light sources used depends on the size of the display surface and the desired resolution. Thus, if a 12" surface along the X dimension is used with a desired resolution of 1", 12 such light sources are required. Infrared light emitting diodes may be used. Another array of such light sources is used for Y-emitters 5 which are located along a side of the display surface adjacent to, and therefore also perpendicular to, the side next to which the X-emitters are positioned. It will be readily appreciated that beams from the X-emitters and Y-emitters form a grid pattern with the desired resolution on display surface 1.

Aligned with and opposite to the X-emitters and Y-emitters are X-detector array 7 and Y-detector array 9, respectively. These detectors can comprise photoconductive transistors sensitive to light from the emitters. Each emitter has a corresponding aligned detector so that the beam from an emitter impinges upon its corresponding detector. The X-detector and Y-detector arrays are fixed with respect to display surface 1 along adjacent and perpendicular sides.

The X-emitter and Y-emitter arrays have emitter drivers 11 and 13, respectively, to power the emitters so as to beam light at the detectors. Scanning circuitry 15 turns the drivers on and off in accordance with a preset timing sequence and duration under the control of a clock signal 17.

X-detectors 7 and Y-detectors 9 have their output signals, respectively, input to detector signal receivers 19 and 21. These receivers process the detected signals and pass them to position-processing circuit 23. This circuit, under the control of clock 17 is synchronized with scanning circuit 15. As a result, circuit 23 expects to sense light at each of the X and Y detectors when the corresponding emitters are activated via scanning circuit 15. With none of the beams blocked, each of the X and Y detectors senses light and consequently generates a signal which is suitably interpreted by circuit 23. When, however, one or more of the X and Y detectors does not send such a signal, this is interpreted by position-processing circuit 23 to mean that an object has been placed between the particular X detector and its emitter as well as between the particular Y detector and its emitter.

Once the blocked X and Y detectors are identified, the position of the interferring object is determined. This position information is then usable by the computer (not shown) to correlate the position pointed to by the operator with the information displayed for him at that position.

The above description of FIG. 1 corresponds to prior art touch screen systems. Its disadvantage lies in that the operator must use his hand to directly point at the display surface with his finger or to grasp a pointer. The hand must, therefore, be removed from the keyboard and then replaced once the pointing step is completed. This can be a major disadvantage, particularly to a non-typist, because of the distraction it causes in having to look down at the keyboard to place the fingers properly and then gaze back at the screen, as well as the time required to remove the hand, replace it, remove the gaze from the screen and then find the position of interest again. Fatigue is another result when one considers how frequently this sequence must be repeated in order to enter any significant amount of information.

In order to cope with the problem of entering information, such as commands and data, into a computer with a keyboard and an alternate input device, the invention provides means which cooperate with foot operated controls. These simulate on the touch screen the effect of a finger blocking the X and Y detectors. Rather than having to actually place an object on the screen, the invention utilizes two small objects each of which is moveable along one of the X and Y detector arrays to block light to a selected detector.

With reference now more specifically to FIG. 1, the invention includes shields, or blocks, 25 and 27 moveable respectively by motors 29 and 31. Block 25 is coupled to motor 29 by some well known means such as a belt or a lead screw arrangement. Block 25 is placed in close proximity to the X-detector array 7 and travels, for example, in a track (not shown) so it remains only in a preset path. Motor 29 is reversible so as to move block 25 back and forth as desired. The operation of motor 29, and therefore the motion and position of block 25, are set by foot operated control 33. The operation and positioning of block 27 along Y-detector array 9 by motor 31 is the same as just-described for block 25 and motor 29. The foot operated control is a conventional device and, therefore, its details are not deemed necessary other than to say that one control operated by the right foot would manipulate motor 31 which another such control operated by the left foot would manipulate motor 29.

Blocks 25 and 27 can be quickly and precisely positioned along any one of the X and Y detectors, respectively. When blocks 25 and 27 are in position, the blocked X and Y detectors transmit a signal to position-processing circuit 23 which is the same as occurs when a finger is placed at the X, Y position on the grid established on the display surface by the X and Y detectors.

Circuit 23 generates as a result an output representing an object located at that X, Y position.

In operation, the display surface provides the operator with a selection of, say, commands. The operator chooses one mentally and then, while keeping his fingers on the keyboard, actuates foot operated control 33 to position block 25 in line just above the selected command and block 27 to its right. The X and Y positions of blocks 25 and 27, respectively, thus correspond to the X, Y coordinates of the selected command. The operator can then immediately proceed to key in the appropriate information.

One advantage of using this approach lies in its incorporation of known touch screen systems. A large number of touch screen systems have been sold. However, obviously all require hand usage. The invention can be used to modify these existing systems. A field retrofit package can be made available which includes blocks 25 and 27, motors 29 and 31, foot operated control 33, and the means to couple motors 29 and 31, respectively, to blocks 25 and 27. This embodiment of the invention can, therefore, be used to readily improve installed touch screen systems.

A second embodiment of the invention is shown in FIG. 2. A touch screen approach is again used but with the aim of eliminating the need to actually touch the screen with any hand-manipulated object. The approach taken in FIG. 2 not only simulates an object, but also simulates the touch screen system. Rather than having X and Y emitters and corresponding X and Y detectors establishing a grid pattern of intersecting light beams above the display surface, no such emitters and detectors are used. Instead, a grid is simulated by an X-indicator array and a Y-indicator array positioned in the same way as the X and Y detectors, respectively, of the FIG. 1 embodiment. The operator can select a desired X-indicator and a Y-indicator corresponding to a desired X, Y position on the display surface. This is an effective yet simpler approach than the previous embodiment.

Display surface 40, X-indicator array 42 and Y-indicator array 44 are depicted in representative relative positions without the associated cabinetry, similar to the approach of FIG. 1. The X-indicators are placed along one side of display surface 40 and the Y-indicators along an adjacent, perpendicular side. As discussed above in relation to the FIG. 1 embodiment, the number of X and Y indicators used depends on the size of display surface 40 and the desired resolution. The X and Y indicators 42 and 44, unlike X and Y emitters 3 and 5, do not beam light across display surface 40. These indicators are devices which, for example, light up when activated. However, the light is directed at the user and away from the display surface rather than across it. A light emitting diode ("LED") can be such a device. Use of these indicators is described below.

Connected to X-indicator 42 is an array of X-drivers 46. Likewise, a Y-driver array 48 is connected to Y-indicators 44. These drivers include switches which, when actuated, power the indicators to produce light. Actuation of drivers 46 and 48 is set by driver control circuit 50. Circuit 50 is connected to foot operated control 52 which determines which of the X and Y drivers is to be switched on. For example, circuit 50 may contain a scanning circuit which is turned on and off by foot operated control 52. The operator views which of indicators 42 is on. If he wishes to select another one, he keeps driver control circuit 50 in a preset scanning sequence mode until the desired X-indicator is lit at which point the foot operated control deactivates the scanning. Such circuits are well known in the art and no further details are, therefore, deemed necessary.

Drive control circuit 50 provides control signals to the X and Y driver arrays to actuate the selected X and Y indicators. Circuit 50 also is connected to position-determining circuit 54. Circuit 54 processes the X and Y information input to it by driver control circuit 50 to determine a position which can be input to other circuitry (not shown) for establishing which of the displayed commands has been selected by the operator.

In operation, a plurality of, say, commands are displayed on surface 40 to the operator. The operator uses foot operated control 52 to light the X-indicator which is directly above the desired command and to light the Y-indicator to its right. Once the appropriate X and Y indicators are lit, the operator can be certain that the correct X, Y coordinates have been entered and the selected command thereby input to the computer. Subsequent entry of information can then be continued with the keyboard.

This input technique is less complex and cheaper than, but nevertheless just as effective as, the FIG. 1 embodiment. Its use would be recommended for those designing a new touch screen system. On the other hand, for those in possession of a touch screen system, the FIG. 1 embodiment might be used to retrofit what they already have.

FIG. 3 discloses a third embodiment of a computer entry technique which requires no use of hands. However, rather than relying on the touch screen approach, a cursor positioning technique is used. It is thought that a video monitor is the best display surface because electronic circuitry for positioning the cursor is contemplated. However, a projection screen could conceivably be used with electro-mechanical cursor positioning means.

FIG. 3 shows video circuitry 60 which controls displays of images on a video monitor. On a raster scan cathode ray tube, for example, circuitry 60 is the conventional beam generating and scanning circuitry. Cursor position processing circuit 62 is also well known. It includes circuitry to operate a cursor image and to enable its movement around the display screen in conjunction with video circuitry 60. One example of such a circuit for cursors can be found in the above-cited U.S. Pat. No. 3,541,541. It includes two perpendicular wheels which control potentiometers to establish cursor position. However, it can only be accomplished in this patent by movement of the hand.

In accordance with the aim of the invention to minimize hand usage, circuit 62 is connected to foot operated control 64. This would include, for example, two small motors for turning the wheels in the just cited patent. Alternatively, the wheels would be replaced with scanning circuitry operated by control 64. These are well known in the art, and no further details are therefore deemed necessary.

In operation, a cursor is displayed on the screen. Its position is controlled with foot operated control 64. The operator views the screen and adjusts control 64 in the X and Y directions until the cursor is properly positioned.

It will be readily apparent that although specific embodiments of the invention have been disclosed above, many changes will readily occur to one skilled in the art. For example, various display surfaces and touch screen systems can be used. Also, foot operated controls of various types such as potentiometer, scanning, analog and digital can be provided for one foot or both feet. These and other such changes are all within the scope of the invention as defined by the following claims:

I claim:

1. Interface apparatus to enable an operator to communicate with a computer system which includes a video display device having a display surface with substantially perpendicular adjacent sides, said apparatus comprising:

an array of light detectors secured along one side of said display surface, and another array of light detectors secured along another side of the display surface adjacent to said one side, each of said light detectors of both arrays terminating at a line, with such lines together corresponding to a grid pattern under the display surface;

one array of light emitters for each of the said arrays of light detectors being secured to the display surface on an opposite side therefrom, with each light emitter having a corresponding light detector, and being aimed thereat;

means coupled to said light detectors for placing each device in a normal state;

means coupled to said light detectors for selectively changing each said light detector to another state, and including foot operated control means to enable said operator to select one light detector from each array to be changed from the normal state to said other state, whereby said selected light detectors indicate a particular position in the grid pattern on said display surface;

wherein the means for changing the state of the light detectors comprises a shield movably mounted between a light emitter array and its corresponding light detector array, and motor driven means coupled to said shield and operated by said foot operated control means; and position processing means coupled to said light detectors for identifying the light detectors which have been changed from said normal state to said another state.

2. Interface apparatus to enable an operator to communicate with a computer system which includes a video display device having a display surface with substantially perpendicular adjacent sides, said apparatus comprising:

an array of light emitting devices secured along one side of said display surface, and another array of light emitting devices secured along another side of the display surface adjacent to said one side, each of said light emitting devices of both arrays terminating at a line, with such lines together corresponding to a grid pattern on a display surface, said light emitting devices being positioned to direct light substantially perpendicular to the display surface;

means coupled to said light emitting devices for placing each device in a normal state;

means coupled to said light emitting devices for selectively changing each said light emitting device to another state, and including foot operated controls to enable said operator to select one light emitting device from each array to be changed to said other state, whereby said selected light emitting devices indicate a particular position in the grid pattern on the display surface; and position processing means coupled to said light detectors for identifying the light detectors which have been changed from said normal state to said another state and for identifying the corresponding position in the grid pattern on the screen surface.

* * * * *